Patented May 26, 1936

2,042,425

UNITED STATES PATENT OFFICE 2,042,425

PHOTOLUMINESCENT GLASS

Waldemar Kaufmann, Lüdwig Eckstein, and Konrad Rosenberger, Frankfort-on-the-Main, Germany, assignors to I. G. Farbenindustrie Aktiengesellschaft, Frankfort-on-the-Main, Germany No Drawing. Application July 16, 1935, Serial No. 31,742. In Germany July 21, 1934

6 Claims. (Cl. 106—36.1)

The present invention relates to photo-luminescent glass.

We have found that glass having an intensive photo-luminescence is made as follows: Glass containing ortho-phosphate or meta-phosphate to the extent that, at least 20 per cent. of the acid constituents of the glass consist of $P_2O_5$ and to which excitable metals such as tin and, if desired, manganese or zirconium have been added either separately or mixed with each other, is fused under neutral, oxidizing or reducing conditions. The reducing condition may be produced by the addition of a reducing agent, such as urea or the like to the glass batch or by exposing the fused mass to a reducing flame.

This glass containing tin is distinguished by the fact that when excited by ultra violet radiation of short wave length, particularly by the resonance line of mercury, it gives a particularly high yield of visible light.

If the light flux sent out from a mercury low pressure discharge tube made of ordinary apparatus glass is 1.8, the following values are found, for instance, for discharge tubes of the same construction and load made from meta-phosphate glass containing tin or copper or manganese:

| Per cent. heavy metal in the glass batch | Value of light: (±10%) | Remarks |
|---|---|---|
| (1) | 1.8 | Ordinary glass. |
| (2) 1 per cent. of $SnO_2$ | 5.7 | Fused in an oxidizing manner. |
| (3) 3 per cent. of $SnO_2$ | 7.2 | Oxidizing (turbid glass). |
| (4) 2 per cent. of $MnCO_3$ | 1.4 | Oxidizing. |
| (5) 2 per cent. of $MnCO_3$ | 1.9 | Reducing. |
| (6) 2 per cent. of CuO | 1.0 | Oxidizing. |
| (7) 1 per cent. of CuO | 1.3 | Reducing. |

In the above table the glass containing manganese and copper is compared with that containing tin, because the first-named glass is distinguished by a particularly intensive luminescence during the radiation with the filter ultraviolet, that is chiefly the radiation of about 3660 Angstrom units. This glass as well as the glass mixed with other oxides exciting luminescence yields a visible fluorescent light by the action of the radiation starting from a mercury low pressure discharge. The intensity of the fluorescent light amounts only to a fraction of the fluorescent light sent out from a glass containing tin. In some cases, for instance in order to obtain a certain degree of coloring of the fluorescent light, other excitable metal oxides may be added to the glass containing tin or the glass may be combined with other glass, for instance by plating or casing. Furthermore the luminescent effect of the glass described may be increased by known methods, such as rendering the glass turbid.

Instead of the mercury low pressure discharges there may also be used other gas discharges or vapor discharges the emission of which lies totally or partially within the area of the short wave ultraviolet, for instance the discharge in the vaporous cadmium either alone or mixed with mercury vapor.

The following examples serve to illustrate the invention, but they are not intended to limit it thereto, the parts being by weight, if not stated otherwise:

(1) To 10 kilograms of a glass batch of the following composition:

| | Parts |
|---|---|
| $H_3PO_4$ (specific gravity 1.75) | 1000 |
| $BaCO_3$ | 175 |
| $Al_2O_3$ | 70 |
| MgO | 55 | there are added 100 grams of tin dioxide and 300 grams of urea. As soon as the vitreous condition has been attained the fused mass is poured out or treated.

A mercury vapor tube the glass wall of which consists of the transparent glass thus prepared which is plated or cased with a turbid glass prepared from the same quantity of fundamental glass with the addition of 200 grams of zirconium dioxide shows a particularly intensive bluish-white luminescent radiation. The spectroscopic analysis of this light shows a continuous spectrum extending from red over the entire visible range far into the long wave ultraviolet, for instance to 2900 Angstrom units. The light value is 11.2.

(2) A glass prepared from

| | Parts |
|---|---|
| $K_2CO_3$ | 550 |
| $CaCO_3$ | 267 |
| $BaCO_3$ | 97 |
| MgO (of 86 per cent. strength) | 259 |
| $H_3BO_3$ | 931 |
| $Al_2O_3$ | 864 |
| $H_3PO_4$ (specific gravity 1.75) | 1280 |
| Urea | 100 |
| $SnO_2$ | 35 |
| $ZrO_2$ | 70 | which contains aluminium ortho-phosphate as the glass forming substance besides boric acid yields a bluish-white luminescence when being used as a case of a mercury vapor lamp.

(3) The following hard glass containing silica shows luminescence similar to that of the glass above described.

| | Parts |
|---|---|
| $K_2CO_3$ | 29 |
| $BaCO_3$ | 129 |
| MgO (of 86 per cent. strength) | 93 |
| Pulverized quartz | 250 |
| Boric acid | 355 |
| Phosphoric acid (specific gravity 1.75) | 175 |
| $Al_2O_3$ | 263 |
| Urea | 40 |
| $SnO_2$ | 15 |
| $ZrO_2$ | 60 |

(4) A glass batch of the following composition:

| | Grams |
|---|---|
| $BaCO_3$ | 350 |
| MgO | 110 |
| $Al(OH)_3$ | 215 |
| $H_3PO_4$ (specific gravity 1.7) | 2200 | is fused with 14 to 30 grams of $SnO_2$. A luminous tube has, according to the table given above, (blue light=1.8) the light value 5.7.

(5) A transparent glass fused according to Batch I is cased or plated with a turbid glass fused according to Batch II.

| I | II |
|---|---|
| 10 grams of $SnO_2$ | 30 grams of $SnO_2$ |
| 224 grams of $Al_2O_3$ | 224 grams of $Al_2O_3$ |
| 146 grams of $K_2CO_3$ | 146 grams of $K_2CO_3$ |
| 36 grams of $CaCO_3$ | 36 grams of $CaCO_3$ |
| 26 grams of $BaCO_3$ | 26 grams of $BaCO_3$ |
| 44 grams of MgO | 44 grams of MgO |
| 284 grams of $H_3BO_3$ | 284 grams of $H_3BO_3$ |
| 380 grams of $H_3PO_4$ (specific gravity 1.7) | 380 grams of $H_3PO_4$ (specific gravity 1.7) |

The light value is 5.3.

(6) By fusing together

| | Grams |
|---|---|
| $K_2CO_3$ | 92 |
| $KNO_3$ | 134 |
| $CaCO_3$ | 89 |
| $BaCO_3$ | 32 |
| MgO | 84 |
| $H_3BO_3$ | 310 |
| $Al_2O_3$ | 288 |
| Ammonium phosphate | 487 |
| $SnO_2$ | 40 | there is obtained a turbid glass of the light value 7.1.

(7) The transparent glass fused according to Batch I is plated or cased with the turbid glass prepared according to Batch II. The light value is 7.1.

| I | II |
|---|---|
| 14 grams of $SnO_2$ | 56 grams of $ZrO_2$ |
| 56 grams of $KMnO_4$ | 350 grams of $BaCO_3$ |
| 350 grams of $BaCO_3$ | 110 grams of MgO |
| 110 grams of MgO | 215 grams of $Al(OH)_3$ |
| 215 grams of $Al(OH)_3$ | 2200 grams of $H_3PO_4$ (specific gravity 1.7) |
| 2200 grams of $H_3PO_4$ (specific gravity 1.7) | |

We claim:

1. A glass containing tin as a metal exciting luminescence and the acid components of which contain at least 20 per cent. of $P_2O_5$, said glass being characterized by the fact that when excited by ultra violet radiation of short wave length it gives a particularly high yield of visible light.

2. A glass containing tin as a metal exciting luminescence and the acid components of which contain at least 20 per cent. of $P_2O_5$ which glass has been melted under a reducing condition, said glass being characterized by the fact that when excited by ultra violet radiation of short wave length it gives a particularly high yield of visible light.

3. A glass containing tin and manganese as metals exciting luminescence and the acid components of which contain at least 20 per cent. of $P_2O_5$, said glass being characterized by the fact that when excited by ultra violet radiation of short wave length it gives a particularly high yield of visible light.

4. A glass containing tin and manganese as metals exciting luminescence and the acid components of which contain at least 20 per cent. of $P_2O_5$ which glass has been melted under a reducing condition, said glass being characterized by the fact that when excited by ultra violet radiation of short wave length it gives a particularly high yield of visible light.

5. A glass containing tin and zirconium as metals exciting luminescence and the acid components of which contain at least 20 per cent. of $P_2O_5$, said glass being characterized by the fact that when excited by ultra violet radiation of short wave length it gives a particularly high yield of visible light.

6. A glass containing tin and zirconium as metals exciting luminescence and the acid components of which contain at least 20 per cent. of $P_2O_5$ which glass has been melted under a reducing condition, said glass being characterized by the fact that when excited by ultra violet radiation of short wave length it gives a particularly high yield of visible light.

WALDEMAR KAUFMANN.
LUDWIG ECKSTEIN.
KONRAD ROSENBERGER.